United States Patent
Kenyon et al.

(10) Patent No.: US 7,174,919 B2
(45) Date of Patent: Feb. 13, 2007

(54) FLOW REDIRECTION MEMBER AND METHOD OF MANUFACTURE

(75) Inventors: Paul W. Kenyon, Pinckney, MI (US); Michael Blackie, New Hudson, MI (US); Keith Shrock, Pinckney, MI (US)

(73) Assignee: Metaldyne Company, LLC, Plymouth, MI (US)

( * ) Notice: Subject to any disclaimer, the term of this patent is extended or adjusted under 35 U.S.C. 154(b) by 0 days.

(21) Appl. No.: 10/970,678

(22) Filed: Oct. 20, 2004

(65) Prior Publication Data

US 2005/0109025 A1  May 26, 2005

Related U.S. Application Data

(60) Provisional application No. 60/512,620, filed on Oct. 20, 2003.

(51) Int. Cl.
*F16L 9/00* (2006.01)

(52) U.S. Cl. .................. 138/37; 138/39; 280/742

(58) Field of Classification Search .......... 138/37, 138/39; 280/730.2, 742
See application file for complete search history.

(56) References Cited

U.S. PATENT DOCUMENTS

| | | | | |
|---|---|---|---|---|
| 253,908 A * | 2/1882 | Brady | .................. | 138/37 |
| 1,279,739 A * | 9/1918 | Merriell | .................. | 138/37 |
| 1,487,845 A * | 3/1924 | Galusha | .................. | 48/63 |
| 1,496,509 A | 6/1924 | Abell et al. | .................. | 138/38 X |
| 1,583,196 A | 5/1926 | Stewart | .................. | 138/37 X |
| 1,989,163 A * | 1/1935 | Beck et al. | .................. | 138/37 |
| 2,141,797 A * | 12/1938 | Minella | .................. | 138/37 |
| 2,164,011 A * | 6/1939 | Hilborn | .................. | 47/2 |
| 2,227,716 A * | 1/1941 | Ingham | .................. | 138/37 |
| 2,479,578 A | 8/1949 | Langvand | .................. | 285/132.1 |
| 2,486,141 A * | 10/1949 | Follo | .................. | 138/37 |
| 2,677,394 A | 5/1954 | Brinen et al. | .................. | 138/38 |
| 3,068,904 A * | 12/1962 | Moody | .................. | 138/37 |
| 3,158,119 A | 11/1964 | Thaller et al. | .................. | 72/364 |
| 3,403,702 A | 10/1968 | Poole | .................. | 138/37 |
| 3,603,129 A | 9/1971 | Williams et al. | .................. | 72/324 |
| 3,981,322 A | 9/1976 | Gebelius | .................. | 137/318 |
| 4,034,777 A | 7/1977 | Gebelius | .................. | 137/318 |
| 4,162,546 A * | 7/1979 | Shortell | .................. | 4/696 |
| 4,450,934 A | 5/1984 | Davis | .................. | 181/228 |
| 4,540,011 A | 9/1985 | Croxford et al. | .......... | 137/15.14 |
| 5,217,066 A | 6/1993 | Killebrew | .................. | 165/161 |
| 5,327,957 A | 7/1994 | Killebrew | .................. | 165/161 |
| 6,164,688 A * | 12/2000 | Einsiedel et al. | ........ | 280/730.2 |

(Continued)

*Primary Examiner*—Patrick F. Brinson
(74) *Attorney, Agent, or Firm*—Robert H. Earp, III; McDonald Hopkins Co., LPA

(57) ABSTRACT

Fluid transmission devices combine and separate fluid flowing therein, and are particularly useful in engine exhaust systems. Given the ever-increasing complexity of exhaust systems, there is a need to reduce construction costs, labor costs, and costs associated with maintaining an inventory of parts. The present fluid transmission device and method of manufacturing comprises a tubular member having a wall, an integral flow redirection member, and an opening. The integral flow redirection member is formed from the wall by cutting a slit in the wall and depressing the wall adjacent the slit until at least a portion of the wall extends within the tubular member. The opening is also formed from depressing the wall. Finally, the flow direction member redirects at least a portion of fluid flow traveling within the tubular member through the opening.

20 Claims, 4 Drawing Sheets

U.S. PATENT DOCUMENTS 6,325,409 B1 * 12/2001 Fischer .................... 280/730.2
6,467,802 B2 * 10/2002 Heigl ......................... 280/729
6,779,562 B2 * 8/2004 Tietze ......................... 138/37

* cited by examiner

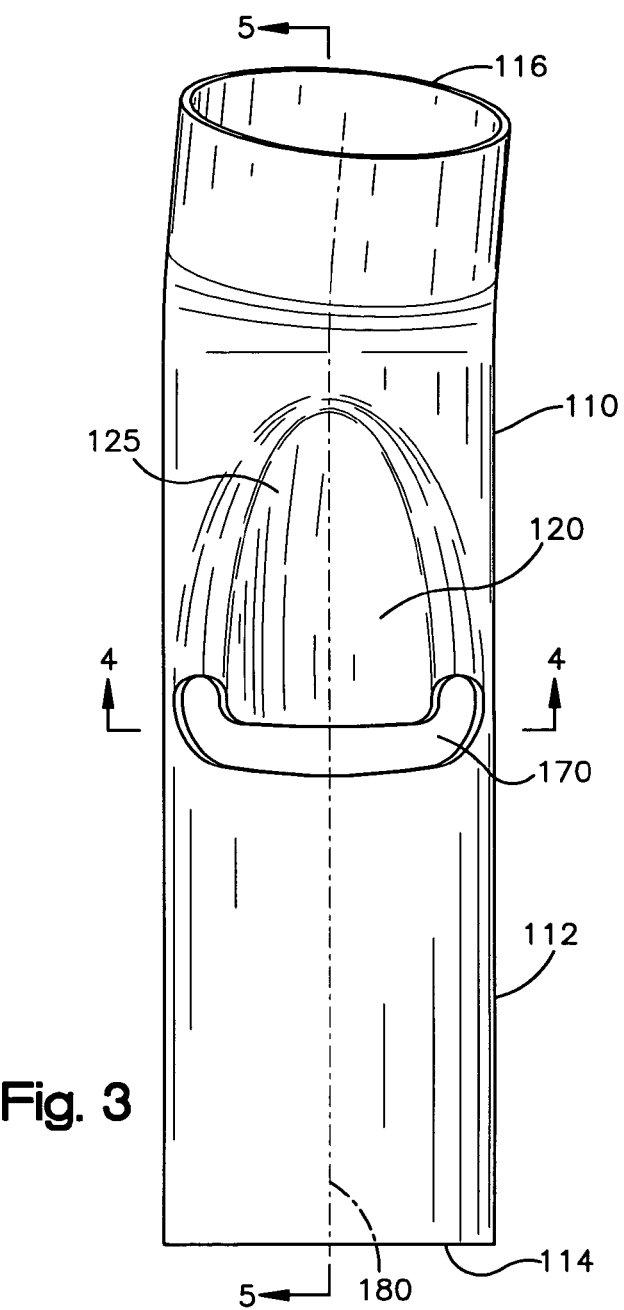
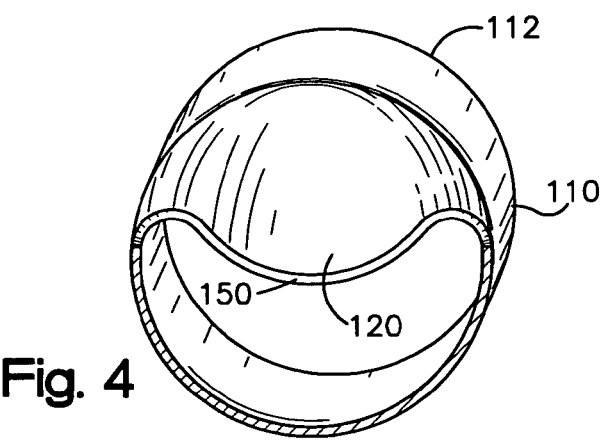
Fig. 3
Fig. 4

FLOW REDIRECTION MEMBER AND METHOD OF MANUFACTURE

CROSS-REFERENCE TO RELATED APPLICATIONS

This application claims priority from U.S. Provisional Patent Application No. 60/512,620 filed on Oct. 20, 2003, which is hereby incorporated by reference.

FIELD OF INVENTION

The present invention relates generally to structures for redirecting fluid flow, and in particular, to integral flow redirection members and method of manufacturing such for dividing fluid flow into two or more flows or combining fluid flows into a single flow.

BACKGROUND

There are numerous constructions and methods of manufacture that provide fluid flow separation or combination in fluid transmission structures. Such transmission structures are typically tubular members used for numerous types of fluid transmission, including water, steam, gas, etc. One of the many fields in which fluid flow separation and combination is required is in the field of exhaust gas transmission for internal combustion engines.

Gases created as a result of the combustion process must be exhausted from the system. Generally, tubular structures transmit these gases from the engine through gas cleaning systems such as catalytic converters and expel these gases to the outside environment. Given that exhaust gases are created in each cylinder of an internal combustion engine and must move efficiently through the transmission system, there is a need in the art to provide fluid flow combination and separation in engine exhaust systems. Further, given the ever-increasing complexity of exhaust systems, there is a need in the art to reduce construction costs, labor costs, and costs associated with maintaining an inventory of parts.

The following description is directed to the preferred embodiment of using the invention with internal combustion engine exhaust components. Clearly the present invention also is applicable to any other field in which fluid flow transmission is needed and the description herein should in no way limit such applicability. While the present description will describe the invention in terms of providing fluid flow separation during the transmission of exhaust gases, it should be clearly understood that the invention can also be used to provide fluid flow combination during transmission.

Typical exhaust transmission components comprise metal tubes that travel along tortuous paths to accommodate the design complexity and limited space availability of today's automobiles. In addition to transmitting exhaust gases through the exhaust system and into the outside environment, exhaust gases are often redirected for other purposes. One such purpose is to redirect a portion of the exhaust gases back into the engine to be reused during the combustion process, i.e., turbo charge. In typical turbo drives, a portion of the exhaust gas having partially non-combusted fuel is redirected back into the engine to re-mix with fuel and air to increase combustion explosions.

A typical Y-shaped, diverter, exhaust component 10 is shown at FIG. 1 to provide the separation of a single exhaust stream flow X into flow streams Y and Z. Such a component comprises a length of generally tubular metal stock 12 having an inlet 14 and an outlet 16. A connecting flange 18 can be welded at either end to assist in the connection of two tubular members. To provide fluid flow separation, a branch fitting 20 is manufactured and installed onto the tube 12. First, an aperture 22 is formed in the tube 12 where a portion of the exhaust flow is to be directed. A collar 24 is then welded onto the tube 12 so as to surround the aperture 22. A diverter tube 26 is then welded within the collar 24. The diverter tube 26 can comprise numerous configurations, but as shown in FIG. 1, the diverter tube 26 is slightly curved and has an oblique opening which assists in gathering a portion of exhaust flow X. A second flange 28 is welded to the collar 24 to assist in connecting the diverted tubular portion to another tube. Fluid flow diverters of a substantially similar structure have been used, as shown in FIG. 1A, where no flow diverter is present. It is difficult, however, to anticipate or control the amount of exhaust gas flow traveling through the separated flow stream Y without a component to force fluid flow through flow stream Y. Traditional methods of forcing fluid flow redirection described above require the use of separate tubes inserted and welded into apertures formed in a tube structure.

The method of manufacturing the diverter component 10 as shown in FIG. 1 requires numerous components and numerous welds to connect the components. Further, it takes skilled labor to manufacture and assemble such components properly. Also, welding the numerous components can be expensive, time consuming, and dangerous given the temperatures at which the welding process occurs.

Therefore, there is a need in the art to provide a diverter or combining component and a method of manufacturing such a component that requires fewer components, is less expensive to manufacture, is safer, and uses less skilled labor.

SUMMARY OF THE INVENTION

In accordance with the present invention there is provided a fluid transmission device that comprises a tubular member having a wall, an integral flow redirection member formed from the outer wall by cutting a slit in the outer wall and depressing the outer wall adjacent the slit until a portion of the wall extends within the tubular member, an opening formed from depressing the wall, and wherein the flow direction member redirects a portion of fluid flow traveling within the tubular member through the opening.

In another embodiment of the present invention a fluid transmission device is provided. The fluid transmission device comprises a tubular member having a wall, an opening formed by depressing a portion of the wall within the tubular member, an integral flow redirection member formed from the portion of the wall, and wherein the flow direction member has a curved shape to redirect a portion of fluid flow traveling within the tubular member through the opening.

In accordance with the present invention there is further provided a method for manufacturing a fluid transmission device. The method comprises providing a tubular member having a wall, cutting a slit in the wall, depressing the wall adjacent the slit a predetermined depth, and deforming a portion of the wall within the tubular member to form a flow redirection member to redirect a portion of fluid flow traveling within the tubular member and to create an opening in the wall.

DESCRIPTION OF THE DRAWINGS

Objects and advantages together with the operation of the invention may be better understood by reference to the following detailed description taken in connection with the following illustrations, wherein:

FIG. 3 is a top prospective view of the tubular member having the integral flow redirection member of FIG. 2;

FIG. 4 is a cross-sectional view taken along line 4—4 of FIG. 3; and

DETAILED DESCRIPTION OF THE INVENTION

Figure 1:
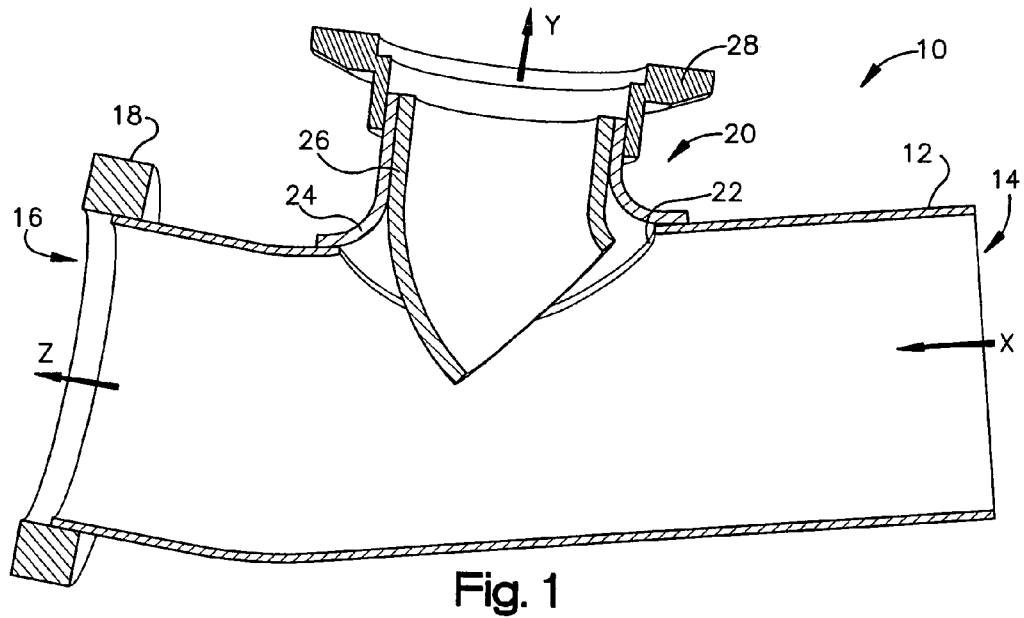
FIG. 1 is cross-sectional view of a known Y-shaped, diverter component.
Figure 1A:
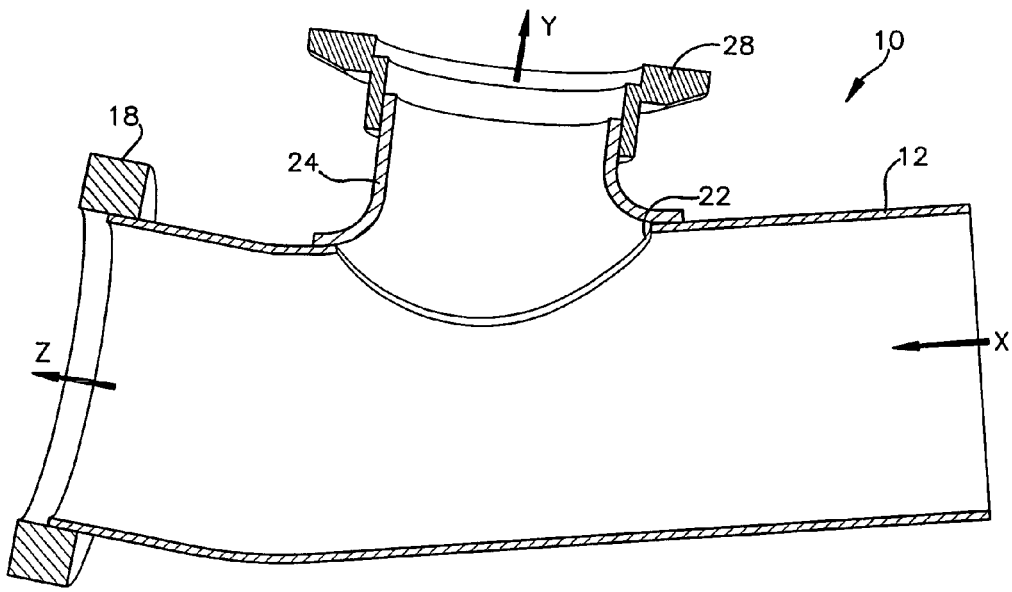
FIG. 1A is a cross-section view of a known Y-shaped, diverter component similar to the diverter component of FIG. 1, but without a diverter tube.

As shown in the accompanying drawings, a fluid transmission device 100 comprises a tubular member 110 having an outer wall 112, an inlet 114, an outlet 116, a first connecting flange 118, and an integrally formed flow redirection member 120. The fluid transmission device 100 further includes a collar 124 connected to the outer wall 112 of the tubular member 110 over an opening 125, a second flange 126 connected to the collar 124, and a second substantially tubular member 130 inserted through the second flange 126 into the collar 124 over the flow redirection member 120 and the opening 125.

The tubular member 110 may be made of any sort of material, including, without limitation, metal, plastic, rubber, or any combination of such materials. The tubular member 110 as shown is cylindrical in shape, but it is not required to be such. As used herein the term tubular is intended to include not only a cylindrical shaped hollow member, but also other shaped hollow members such as polygonal, acircular, etc. The tubular member 110 can be an exhaust pipe used with internal combustion engines, but is not limited to such. As shown in the drawings, the first connecting flange 118 is connected to the tubular member 110 at the outlet 116 by a process such as welding. An identical flange may also be connected to the tubular member 110 at the inlet 114 in a similar manner. The first connecting flange 118 assists in the connection of additional tubular members to the tubular member 110.

The second tubular member 130 can also be made of any sort of material, including, without limitation, metal, plastic, rubber, or any combination of such materials. It can also be any sort of shape, not just the cylindrical shape shown in the drawings, such as polygonal, acircular, etc. Finally, the second tubular member 130 can also be an exhaust pipe used with internal combustion engines, but is not limited to such.

The flow redirection member 120 of the present invention is integrally formed from the outer wall 112 of the tubular member 110. The flow direction member 120 can also be a flow flap formed integrally from the outer wall 112 of the tubular member 110. The flow redirection member 120 can have a variety of shapes, including a curved shape, and more particularly, as shown in FIG. 4, the flow redirection member 120 can be formed to have a scooped shaped portion 150 wherein fluid flows over the scooped shaped portion 150. The curved shape flow redirection member 120 reduces the turbulent flow of the fluid over the curved shape and through the opening. The curved shaped portion 150 provides laminar flow providing a smoother turn for the fluid flow. This, therefore, reduces the heat concentration directed to discrete portions of the flow redirection member 120. It provides for lower heat concentrations than a straight shaped redirection member would. It also helps to ensure that the transition is formed consistently from part to part. The flow redirection member 120, however, is not limited to a scoop shape. It can have a variety of shapes depending upon the use thereof, i.e., the shape thereof influences the flow of fluid. For example, the flow redirection member 120 shown in FIG. 2 redirects a portion of the fluid flow traveling within the tubular member 110 along the direction shown by arrow X into a first fluid flow path 155 in the tubular member 110. It also permits the remaining portion of fluid to flow into a second fluid flow path 160 in the second tubular member 130.

A method for manufacturing the fluid transmission device 100 having an integral flow redirection member 120 is shown in the accompanying drawings. The formation of the integral flow redirection member 120 is initiated by cutting a slit 170 in the outer wall 112 of the tubular member 110, as shown in FIG. 3. Preferably, the slit 170 is cut substantially perpendicular to a centerline 180 of the tubular member 110. While the slit 170 can have numerous shapes or configurations, the slit 170 presently comprises either a straight cut or a curved cut as shown in FIG. 3. Presently neither is preferred over the other. The straight cut resembles a skinny oval having substantially straight flat sides with rounded corners. The curved cut resembles a flattened U shape, as shown in FIG. 3.

After the slit 170 is made through the outer wall 112 of the tubular member 110, the tubular member 110 is placed into a lower die that holds the tubular member 110 in place by cradling a bottom half 190 of the tubular member 110. An upper die is then lowered onto the tubular member 110 such that the tubular member 110 is completely captured in the dies.

An arbor is slid into either the inlet 114 or the outlet 116 of the tubular member 110 to support the area under the location of the flow redirection member 120. A punch then depresses the tubular member 110 adjacent the slit 170 (on the concave side of the curved cut). The punch, therefore, depresses a local portion of the tubular member 110 until that local portion is plastically deformed and pressed against the arbor. Depending upon the configuration of the punch and the arbor, the local portion of the tubular member 110, or the wall 112 is deformed so as to create the specific shape of the flow redirection member 120, as described above. Preferably, the end of the punch is curved so as to form the transitional curve or scoop in the outer surface of the flow redirection member 120. At the same time the flow redirection member 120 is formed, the opening 125 is formed. It is formed from the depression of the punch into the wall 112 as described above. After the formation of the integral flow redirection member 120 is complete, the punch is raised and the arbor is retracted. The upper die is then raised and the finished flow transmission device 100 can be removed from the lower die cavity.

Clearly, the depth at which the punch depresses the outer wall 112 of the tubular member 110 to form the flow redirection member 120 is easily manipulated. The depth at which the flow redirection member 120 extends within the tubular member 110 correlates with the amount of exhaust gas redirected through the first flow path 155. Further, the punch and the arbor can be configured to provide distinct shapes in the resultant integral flow redirection member 120 so as to affect the diverted flow path, the second flow path 160, and resultant heat imparted on the flow redirection member 120 as described above.

Figure 2:
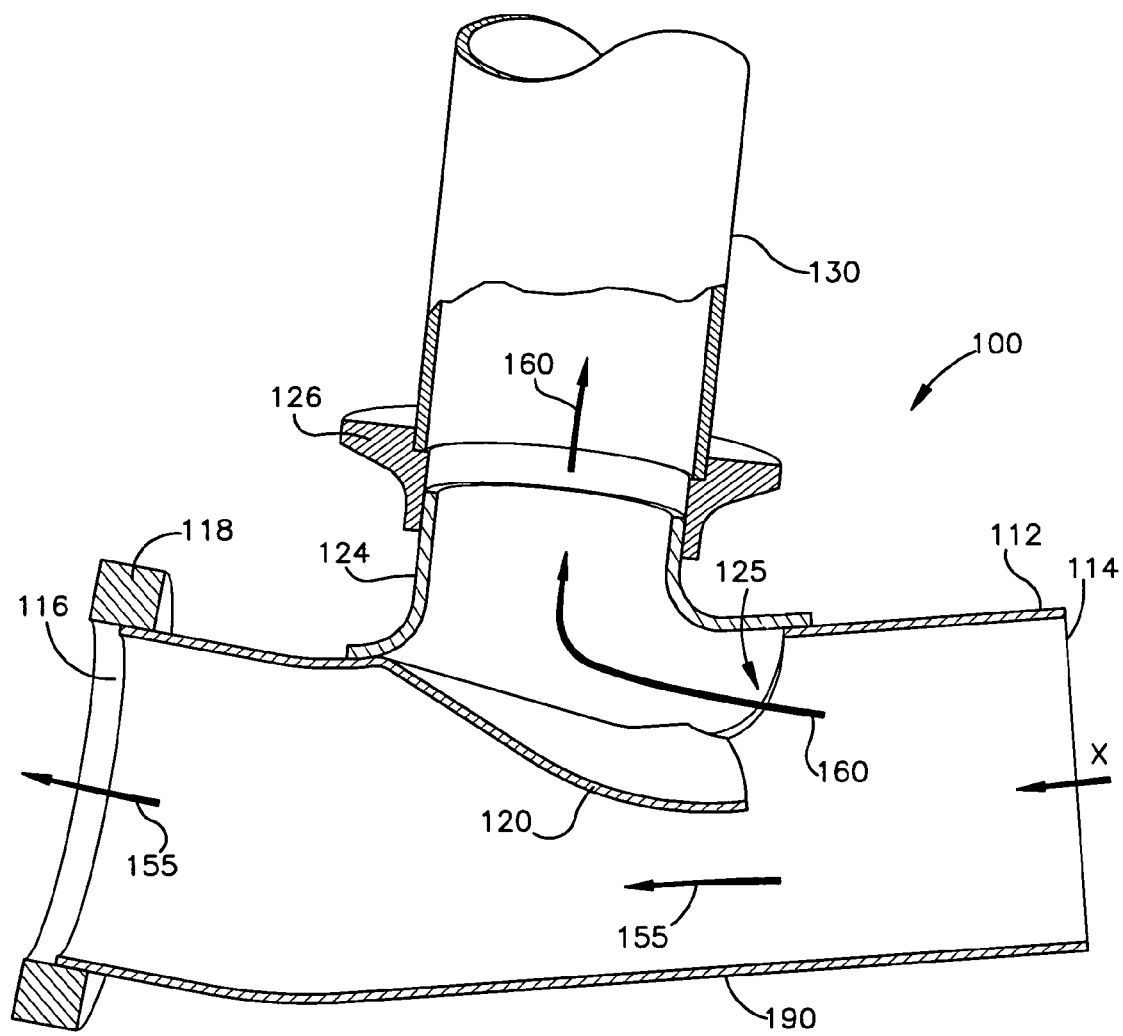
FIG. 2 is a prospective view of a tubular member having an integral flow redirection member according to the present invention.
Figure 5:
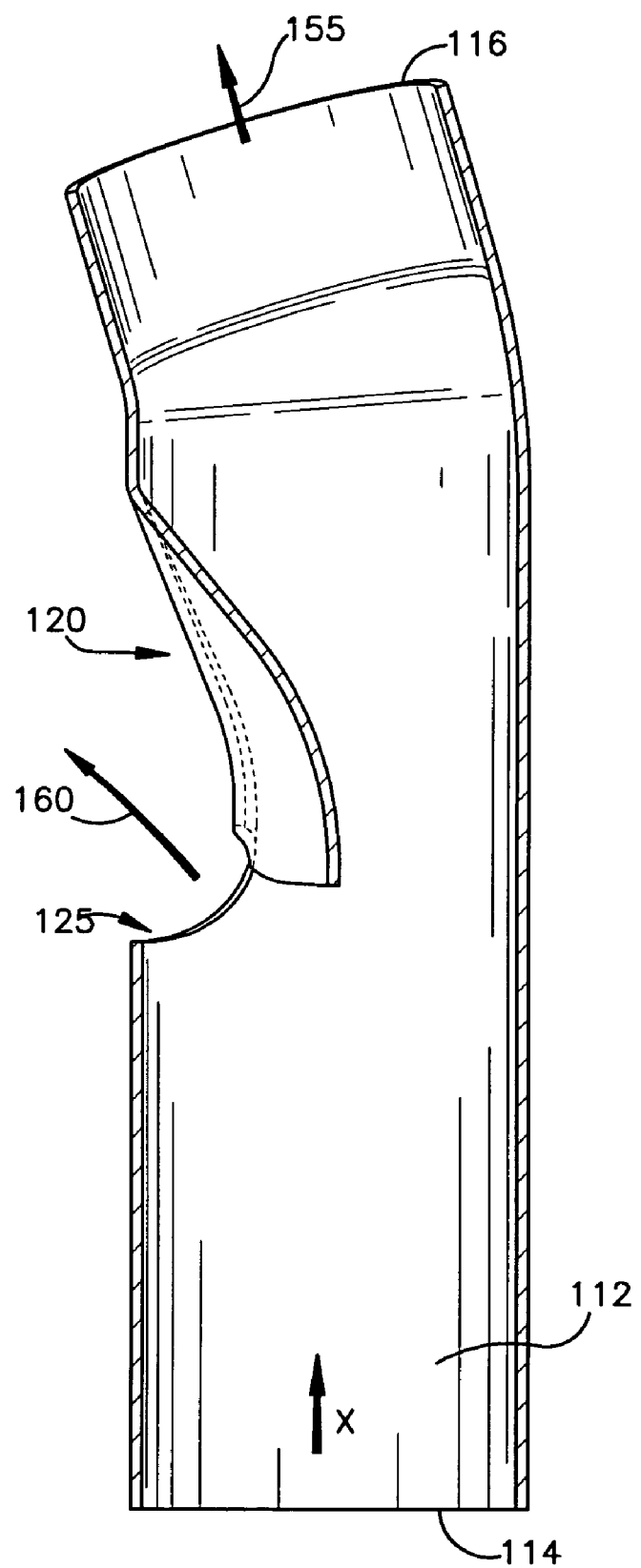
FIG. 5 is a cross sectional view of the tubular member having the integral flow redirection member taken along line 5—5 of FIG. 3.

Given the ease at which such configuration modifications can be manufactured, distinct flow redirection characteristics can be achieved. Nevertheless, during use, fluid flow that reaches the flow redirection member 120 will travel over the scoop shaped portion and be redirected through the second flow path 160 to the second tubular member 130. The second tubular member 130 is removably connected to the collar 124, which is connected to the outer wall 112 of the tubular member 110 by a process such as welding over the flow redirection device 110 as shown in FIG. 2. The remaining fluid flow passing through the tubular member 110 that is not redirected by the flow redirection member 120 passes around the flow redirection member 120 and will continue to flow through the first flow path 155 in the tubular member 110.

Therefore, as shown in the drawings and described above, the integral flow redirection member 120 and method of manufacturing the same of the present invention is an improvement over the prior art devices and methods of manufacture and result in considerable cost savings related to materials, labor, and time required for production.

The invention has been described above and, obviously, modifications and alternations will occur to others upon a reading and understanding of this specification. In addition, the method of assembly described above is not limited to the order in which the steps above are recited. The claims as follows are intended to include all modifications and alterations insofar as they come within the scope of the claims or the equivalent thereof.

Having thus described the invention, we claim:

1. A fluid transmission device, comprising:
a tubular member having a wall;
an integral flow redirection member formed from the wall wherein the flow redirection member is a slit in the wall depressed within the tubular member adjacent the slit and further wherein a portion of the flow redirection member extends within the tubular member;
an opening formed in the wall from the flow redirection member being depressed within the tubular member;
a collar connected to the wall at the opening in the wall; and
wherein the flow redirection member redirects a portion of fluid flow traveling within the tubular member through the opening and into the collar.

2. The fluid transmission device of claim 1, wherein the flow redirection member is a flow flap.

3. The fluid transmission device of claim 2, wherein the flow flap has a scooped shaped portion wherein fluid flows over the scooped shaped portion.

4. The fluid transmission device of claim 1, further comprising a second tubular member removably connected with the collar.

5. The fluid transmission device of claim 4, wherein the flow flap redirects a portion of fluid traveling within the tubular member to a first flow path in the tubular member, through the opening, and into the second tubular member.

6. The fluid transmission device of claim 5, wherein the tubular member and the second tubular member are exhaust pipes for an internal combustion engine.

7. The fluid transmission device of claim 4, wherein the flow flap combines fluid traveling within the second tubular member with fluid traveling within the tubular member.

8. The fluid transmission device of claim 1, wherein the slit is a substantially straight cut.

9. The fluid transmission device of claim 1, wherein the slit is a curved cut.

10. A fluid transmission device, comprising:
a tubular member having an exterior wall made of a material;
an opening formed in the exterior wall by depressing a portion of the exterior wall within the tubular member;
an integral flow redirection member formed from the same material as the exterior wall and formed from the portion of the exterior wall depressed within the tubular member;
a separable collar connected to the wall at the opening in the wall; and
wherein the flow redirection member has a curved shape to redirect a portion of fluid flow traveling within the tubular member through the opening and into the collar.

11. The fluid transmission device of claim 10, wherein the flow redirection member has a scooped shaped portion wherein fluid flows over the scooped shaped portion.

12. The fluid transmission device of claim 11, wherein the fluid transmission device is an exhaust system for an internal combustion engine for redirecting flow of exhaust gas.

13. The fluid transmission device of claim 12, wherein the curved flow redirection device provides laminar flow over the flow redirection member, the laminar flow reducing the heat concentration caused from the exhaust gas flowing over the flow redirection member.

14. An exhaust for a vehicle, the exhaust comprising:
a tubular member having a wall made of a particular material;
an integral flow redirection member formed from the particular material of the wall, the flow redirection member consisting of: a slit in the wall depressed within the wall adjacent the slit whereby a portion of the wall extends within the tubular member;
an opening formed in the wall of the tubular member from the slit depressed within the wall;
a collar connected to the wall at the opening in the wall;
a second tubular member removably connected with the collar; and
wherein the flow redirection member redirects a portion of exhaust gases traveling within the tubular member through the opening and into the second tubular member.

15. The exhaust of a vehicle of claim 14 wherein said collar is welded to said tubular member.

16. The exhaust of claim 14 wherein said slit is substantially perpendicular to a centerline of said tubular member.

17. A fluid transmission device, comprising:
a tubular member having a wall;
a portion of the wall depressed within an interior of the tubular member wherein the portion of the wall is capable of redirecting fluid flow within the tubular member;
an opening formed in the tubular member from the depressed portion wherein the opening has a perimeter at the wall of the tubular member; and
a collar attached to the tubular member at the perimeter of said opening wherein the portion of the wall is shaped to redirect at least a portion of the fluid flow into the collar.

18. The fluid transmission device of claim 17 further comprising: an exhaust pipe attached to the collar in fluid communication with the tubular member.

19. The fluid transmission device of claim 17 wherein the portion of the wall is deformed to have a curved shaped to redirect a portion of the fluid flow traveling within the tubular member.

20. The fluid transmission device of claim 17 wherein the collar is welded to the tubular member.

* * * * *

UNITED STATES PATENT AND TRADEMARK OFFICE
CERTIFICATE OF CORRECTION

| | | |
|---|---|---|
| PATENT NO. | : 7,174,919 B2 | Page 1 of 1 |
| APPLICATION NO. | : 10/970678 | |
| DATED | : February 13, 2007 | |
| INVENTOR(S) | : Paul W. Kenyon, Michael Blackie and Keith Schrock | |

It is certified that error appears in the above-identified patent and that said Letters Patent is hereby corrected as shown below:

Title page, item (75)
In the Inventors:

delete "Keith Shrock" and insert --Keith Schrock--

Signed and Sealed this

Twenty-sixth Day of June, 2007

JON W. DUDAS
*Director of the United States Patent and Trademark Office*